US012687529B2

(12) United States Patent
Ivosev et al.

(10) Patent No.: US 12,687,529 B2
(45) Date of Patent: Jul. 21, 2026

(54) METHOD AND SYSTEM FOR MASS SPECTROMETRY SIGNAL QUALITY ASSESSMENT

(71) Applicant: DH Technologies Development Pte. Ltd., Singapore (SG)

(72) Inventors: Gordana Ivosev, Condord (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 481 days.

(21) Appl. No.: 18/259,211

(22) PCT Filed: Sep. 21, 2021

(86) PCT No.: PCT/IB2021/000639
§ 371 (c)(1),
(2) Date: Jun. 23, 2023

(87) PCT Pub. No.: WO2022/144584
PCT Pub. Date: Jul. 7, 2022

(65) Prior Publication Data
US 2024/0068997 A1      Feb. 29, 2024

Related U.S. Application Data

(60) Provisional application No. 63/131,054, filed on Dec. 28, 2020.

(51) Int. Cl.
*G01N 30/86*      (2006.01)
*B01D 15/08*      (2006.01)
*G01N 30/72*      (2006.01)

(52) U.S. Cl.
CPC ......... *G01N 30/8624* (2013.01); *B01D 15/08* (2013.01); *G01N 30/72* (2013.01)

(58) Field of Classification Search
CPC .. H01J 49/0031; H01J 49/0009; B01D 15/08; G01N 30/72; G01N 30/8624
See application file for complete search history.

(56) References Cited

U.S. PATENT DOCUMENTS 5,885,841 A      3/1999  Higgs, Jr
10,429,364 B2 *  10/2019  Mohtashemi ...... G01N 30/7233
(Continued)

FOREIGN PATENT DOCUMENTS

EP      2594936 A2     5/2013

OTHER PUBLICATIONS

International Search Report and Written Opinion for PCT Patent Application No. PCT/IB2021/000639 mailed Feb. 1, 2022.
(Continued)

*Primary Examiner* — An H Do
(74) *Attorney, Agent, or Firm* — Lathrop GPM LLP; Malaika O.D. Tyson; Jason Kuchar

(57)      ABSTRACT

Methods and systems for a signal quality assessment for mass spectrometry are provided. The system includes a processor that utilizes a wavelet-based feature extraction for the signal quality assessment of a chromatogram signal. The signal quality assessment is used to control operational parameters such as a flowrate of a pump that moves liquid droplets toward an ionization device of a mass spectrometer.

18 Claims, 8 Drawing Sheets

(56)        References Cited

U.S. PATENT DOCUMENTS

| 10,444,206 | B2 * | 10/2019 | Taneda | ............... | G01N 30/8631 |
| 2019/0157061 | A1 | 5/2019 | Datwani | | |

OTHER PUBLICATIONS

Raymundo Sanchez-Ponce et al., "Untargeted Analysis of Mass Spectrometry Data For Elucidation of Metabolites and Function of Enzymes", Analytical Chemistry, vol. 79, No. 9, May 1, 2007, pp. 3355-3362, XP055138988.

* cited by examiner

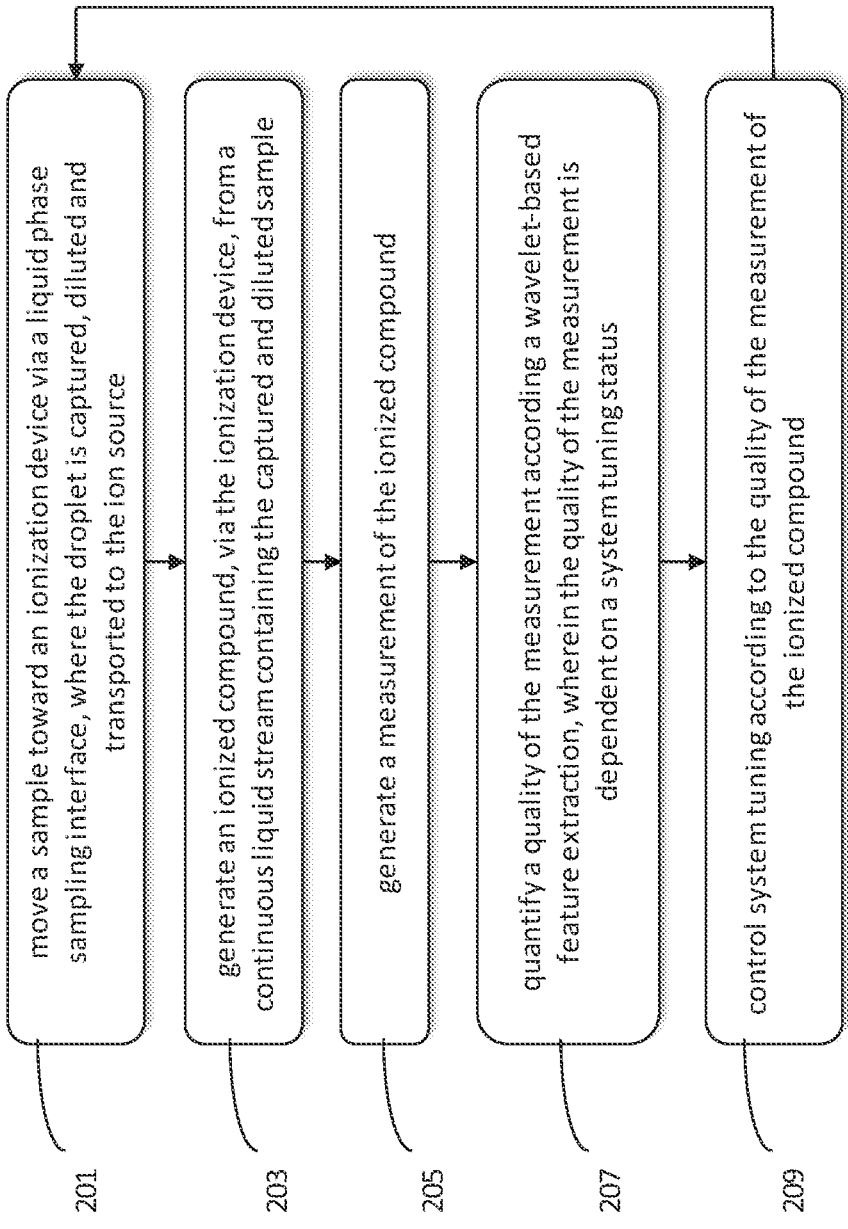

201 move a sample toward an ionization device via a liquid phase sampling interface, where the droplet is captured, diluted and transported to the ion source 203 generate an ionized compound, via the ionization device, from a continuous liquid stream containing the captured and diluted sample 205 generate a measurement of the ionized compound 207 quantify a quality of the measurement according a wavelet-based feature extraction, wherein the quality of the measurement is dependent on a system tuning status 209 control system tuning according to the quality of the measurement of the ionized compound

FIG. 2

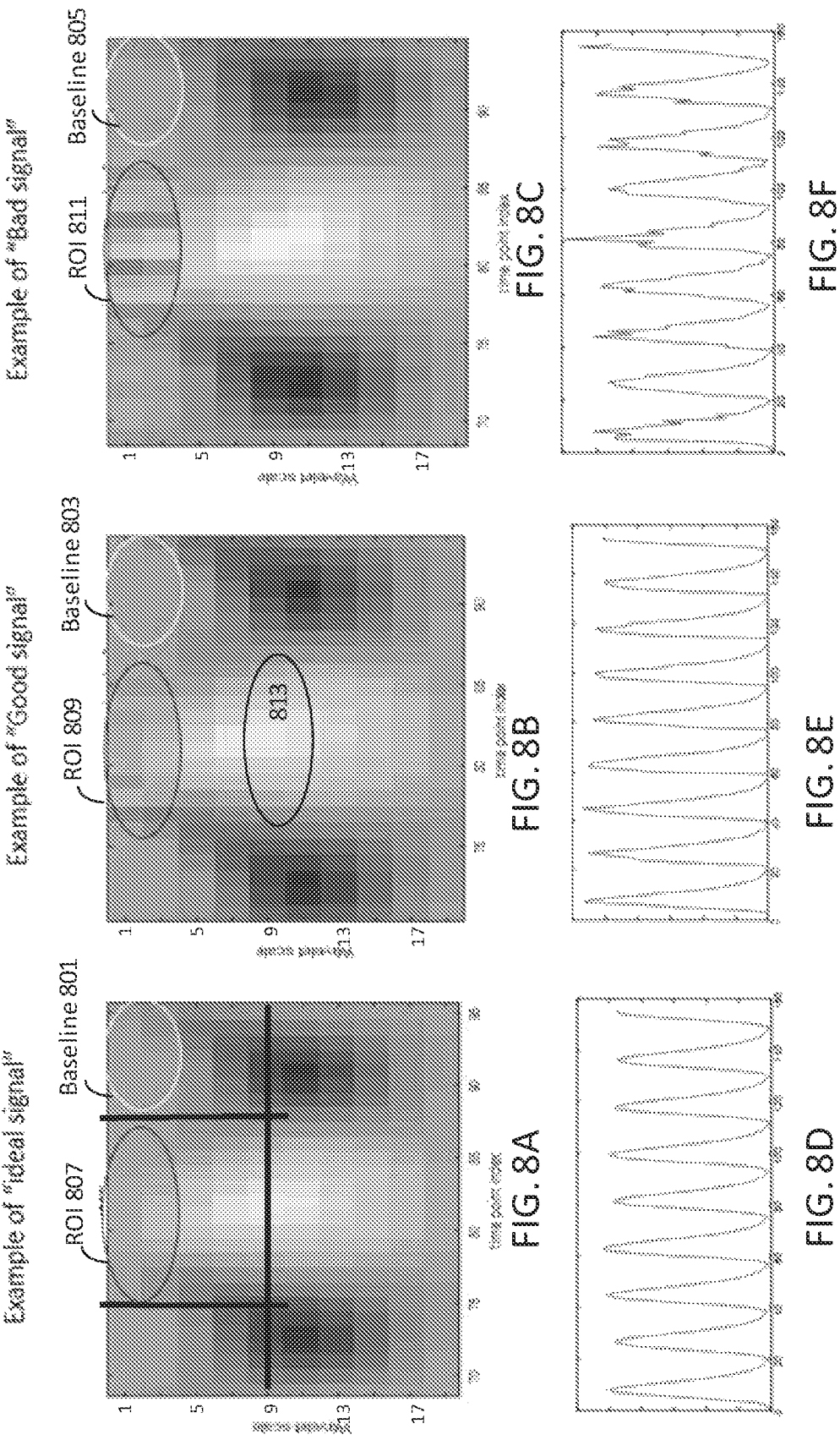

METHOD AND SYSTEM FOR MASS SPECTROMETRY SIGNAL QUALITY ASSESSMENT

RELATED APPLICATIONS

The present application is filed pursuant to 35 U.S.C. 371 as a U.S. National Phase application of International Patent Application No. PCT/IB2021/000639, which was filed Sep. 21, 2021, claiming the benefit of U.S. Provisional Application No. 63/131,054, filed Dec. 28, 2020. The entire text of the aforementioned applications is incorporated herein by reference in its entirety.

BACKGROUND

Limitations and disadvantages of conventional approaches to assessing signal quality for mass spectrometry will become apparent to one of skill in the art, through comparison of such approaches with some aspects of the present method and system set forth in the remainder of this disclosure with reference to the drawings.

BRIEF SUMMARY

Methods and systems are provided for assessing signal quality, substantially as illustrated by and/or described in connection with at least one of the figures, as set forth more completely in the claims.

BRIEF DESCRIPTION OF THE DRAWINGS

FIG. 2 illustrates an exemplary method for compound tuning for mass spectrometry in accordance with various embodiments of the disclosure.

FIGS. 8A-8C illustrates the wavelet scale-space response of three corresponding signals (in FIGS. 8D-8F respectively) in accordance with various embodiments of the disclosure.

DETAILED DESCRIPTION

Mass spectrometry (MS) is an analytical technique that measures the mass-to-charge ratio of ions. The results are typically presented as a mass spectrum, which is a plot of intensity as a function of the mass-to-charge ratio. The results may also be presented as a signal of a certain m/z, or a certain multiple reaction monitoring (MRM) transition vs time, e.g., chromatogram for a liquid chromatography mass spectrometer (LC-MS) or chronogram for infusion or acoustic ejection mass spectrometry (AEMS). In some cases a differential mobility spectrometer (DMS) may be combined with a MS to provide for separation of ions by ion mobility before introduction into the MS for analysis (DMS-MS).

This disclosure provides a system and method for signal quality assessment. While certain embodiments are directed to tuning AEMS systems, the disclosed system and method is also applicability to LC-MS, DMS-MS and other MS systems. This disclosure introduces a quantitative measure of the peak-choppiness, i.e. a signal quality metric, and the use of the peak-choppiness as an indicator that the MS system is well-tuned. In some embodiments, systems and methods are provided for evaluating a mass analysis output signal produced by a MS, and to generating a signal quality metric for the mass analysis output signal. The systems and methods may further be operative to compare the signal quality metric with an expected signal quality metric of an "ideal" signal in order to evaluate whether the system is operating within expected operating parameters.

Figure 1:
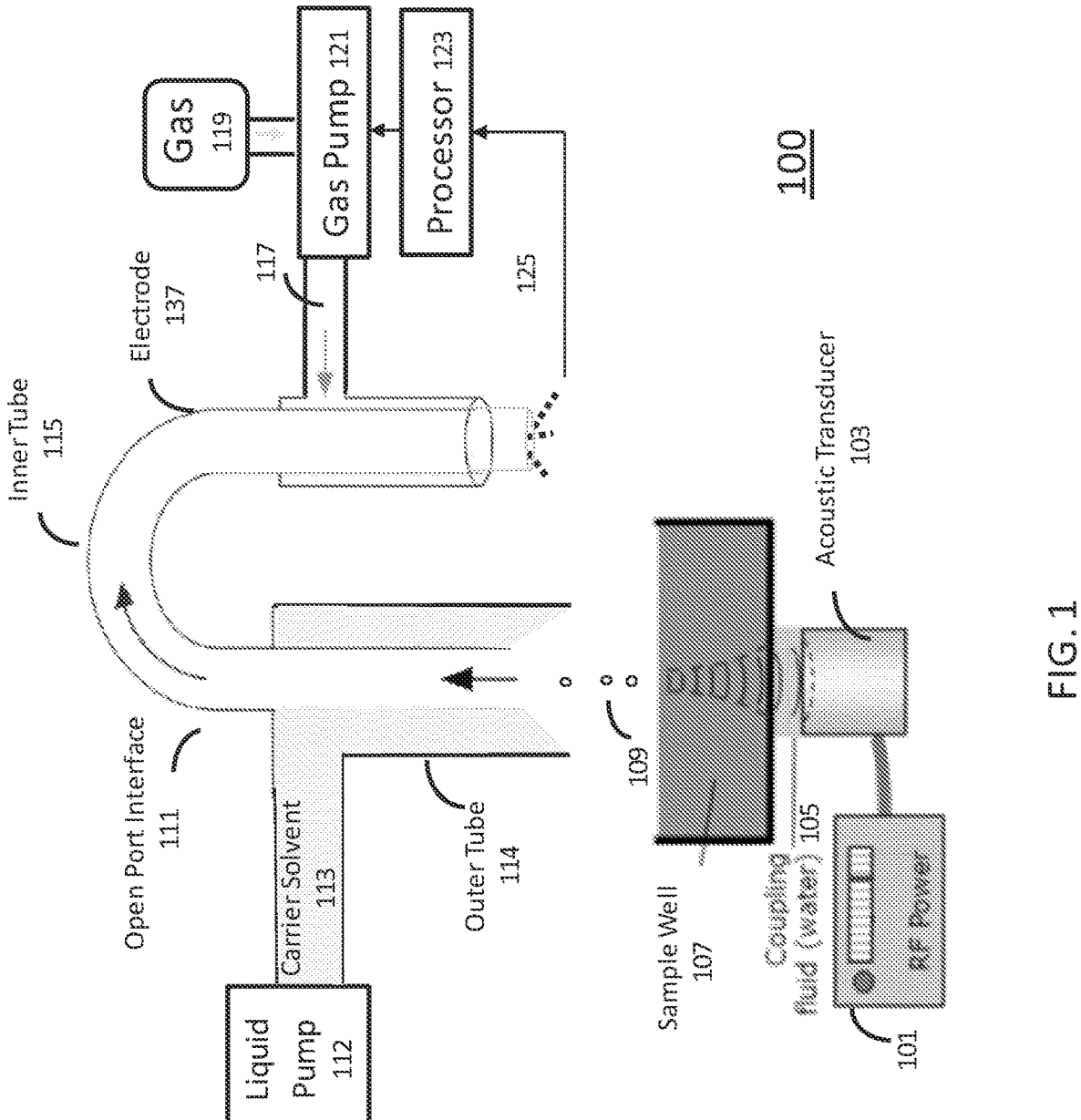
FIG. 1 illustrates an exemplary mass spectrometry system in accordance with various embodiments of the disclosure.

As an example, the present application describes an embodiment of the systems and methods in the context of an AEMS system. This is by way of example and, while the AEMS system has a particular need for these systems and methods, other MS systems may also benefit. FIG. 1 illustrates an exemplary AEMS system 100 in accordance with various embodiments of the disclosure. In the AEMS system 100, an RF power source 101 is coupled to an acoustic transducer 103 to generate acoustic energy that is used to create and amplify a standing wave in liquid in a coupling fluid (e.g., water) 105 and a sample well 107 that comprise an assay. As the amplitude of the standing wave increases, a point is reached when a single droplet 109 is ejected from the wave at its central apex. This acoustic droplet ejection (ADE) may be very tightly controlled, generating consistent volume droplets from liquid in a reservoir, such as one reservoir of a plurality of reservoirs of a plate well (e.g., 384-well plate or 1536-well plate) on a microsecond time scale.

The ADE may be used to transfer sample droplets (e.g., 2.5 nL droplets) 109 to an open port interface (OPI) 111. Multiple ejection cycles may be sequentially run very quickly (e.g., 100 to 500 Hz) depending on the sample liquid, so multiple sample droplets effectively merge together for a larger effective ejection volume. The OPI 111 is positioned above the sample well 107 to allow the capture of the acoustically ejected sample droplet 109, dilution in the capture fluid (e.g. solvent) and transport of the sample-solvent dilution to an electrode 137 that ionizes the sample-solvent dilution at a sample outlet comprising ESI 125.

In the embodiment of FIG. 1, the OPI 111 comprises a pair of concentrically positioned tubes (114, 115) that are both open at one end to define a capture region. The outer tube 114 supplies a capture fluid (e.g., carrier solvent 113) delivered to it from a solvent source by a low pressure, liquid supply pump 112. The inner tube 115 forms a continuous fluid pathway, via a transfer line, to the capillary and outlet of the ESI 125.

A nebulizer gas (GS1) 117 provides an aspirating "pull" that draws the solvent 113 delivered from the outer tube 114 into the inner tube 115. The flowrate of the nebulizer gas 117 may be determined by a pump 121 coupled to a gas source 119, or by a valve controlling release of a pressurized nebulizer gas supply, for instance.

The vortex that results when the carrier solvent 113 makes the turn from the outer tube 114 to the inner tube 115 provides a capture region where the droplet 109, created by ADE, enters the liquid flow and is then carried to the ESI capillary 125.

The liquid stream is vaporized by ESI and measured as an open port interface (OPI) signal by the electrode 137, which is part of the inner/transfer tube 115. Ionized compounds may be quantified as MS data according to the spectrum of the OPI signal. The stability of the MS OPI signal over time may indicate how well the AEMS tuning status is optimized. A quantitative assessment of the stability of the MS OPI signal is generated in a processor 123. The processor 123 may also control the pump 121 via feedback, such that the flowrate of the nebulizer gas 117 is adjusted. Changing the gas itself may not always optimize the choppiness of the OPI signal. Multiple factors may cause peak choppiness. For example, gas stability, flow stability, protrusion, solvent flowrate, and/or alignment may be adjusted to optimize the choppiness of the OPI signal.

A mass chromatogram is a representation of mass spectrometry data as a chromatogram, where the x-axis represents retention time and the y-axis represents signal intensity. This data representation may be used in conjunction with liquid chromatography—mass spectrometry (LC-MS) or gas chromatography—mass spectrometry (GC-MS). While the chromatogram is the output from a chromatograph (e.g., LC or GC), the present disclosure is not limited to GC-MS and LC-MS.

An LC-MS, for example, outputs an extracted-ion chromatogram (XIC). In an XIC, one or more m/z values representing one or more analytes of interest may be recovered ('extracted') from the entire data set for a chromatographic run.

The total intensity or base peak intensity within a mass tolerance window around a particular analyte's mass-to-charge ratio may be plotted at every point in the analysis. The size of the mass tolerance window typically depends on the mass accuracy and mass resolution of the instrument collecting the data. This is useful for re-examining data to detect previously-unsuspected analytes, to highlight potential isomers, resolve suspected co-eluting substances, or to provide clean chromatograms of compounds of interest. An XIC signal, for example, may be generated by separating the ions of interest from a data file containing the full mass spectrum over time after the fact.

FIG. 2 illustrates an exemplary method for system tuning for mass spectrometry in accordance with various embodiments of the disclosure. At 201, a sample is moved toward an ionization device via a liquid phase sampling interface. During this process, a droplet is captured, diluted and transported to the ion source. At 203, an ionized compound is generated, via the ionization device, from a continuous liquid stream containing the captured and diluted sample. At 205, a measurement of the ionized compound is generated. At 207, a quality of the measurement is quantified according a wavelet-based feature extraction. As described above, the quality of the measurement may be dependent on a number of system parameters. Thus, the quantified measurement provides a system tuning status. At 209, system tuning is controlled according to the quality of the measurement of the ionized compound. For example, gas flowrate, gas stability, flow stability, protrusion, solvent flowrate, and/or alignment may be adjusted to optimize the choppiness of the OPI signal.

The wavelet method is convenient because it inherently adds a smoothing operation and identifies local maxima/minima. Wavelet analysis also breaks down a signal segment into its various frequency components. A large high frequency component, for example, is indicative of choppiness in that segment.

The wavelet method is an exemplary embodiment of the present disclosure, as other embodiments are also contemplated. Alternative methods may include, for example, segmenting the mass analysis output signal and determining a measure of continuity or smoothness for each segment.

A region of interest, such as a mass peak or regions within a mass peak, is segmented (wavelets provide one method of segmentation). A number of local maxima/minima within the segmented region are identified. A "smoothness" or signal quality metric may then be generated for each segment. The measure of signal quality based on a continuity/smoothness of the signal may include, for example, a calculation of a local derivative or second derivative, local maxima/minima detection, statistical measures of continuity or "spread" within the sample points, curve fitting and/or measure of fit of a template curve (e.g., $r^2$, $c^2$, etc.), and other known numerical methods for evaluating continuity or smoothness of a data series to generate a signal quality metric value. For each mass peak, a generally smooth curve with a peak may be expected—i.e. one global maximum and "smooth" segments making up the peak.

In some embodiments, the signal quality metric value may be compared to a threshold value to confirm signal quality is within an expected range. In some embodiments, the signal quality metric value of one or more segments may be compared to an expected "ideal" signal quality for an "ideal" signal. In some embodiments, the "ideal" signal may be represented by capturing live data and applying a smoothing function to the captured data to produce smoothed data. A quality metric determined from the smoothed data may be used to represent the "ideal" signal quality for each segment. This approach preserves the general peak character (e.g. skew, symmetry/asymmetry, peak width, etc.) for each mass peak.

In some embodiments, an adjustment may be made to at least one acquisition operational parameter, and a further signal quality metric value may be collected. This adjustment and collection may be repeated to optimize the at least one acquisition operational parameter. The signal quality metric may be advantageous, especially where (e.g., in LC-MS) the goal is to evaluate a group of systems to ensure similar functionality. For example, the accumulation time for LC-MS may be adjusted. After a certain count of ions and/or a duration of an observation, the detected signal may be choppy. This method allows for an evaluation of the detected signal to determine whether or not the signal quality could be improved by further accumulation. Theoretical models of noise or error may not be sufficient to tune the system. Live detector response is required in order to set operational parameters.

Figures 3A, 3B:
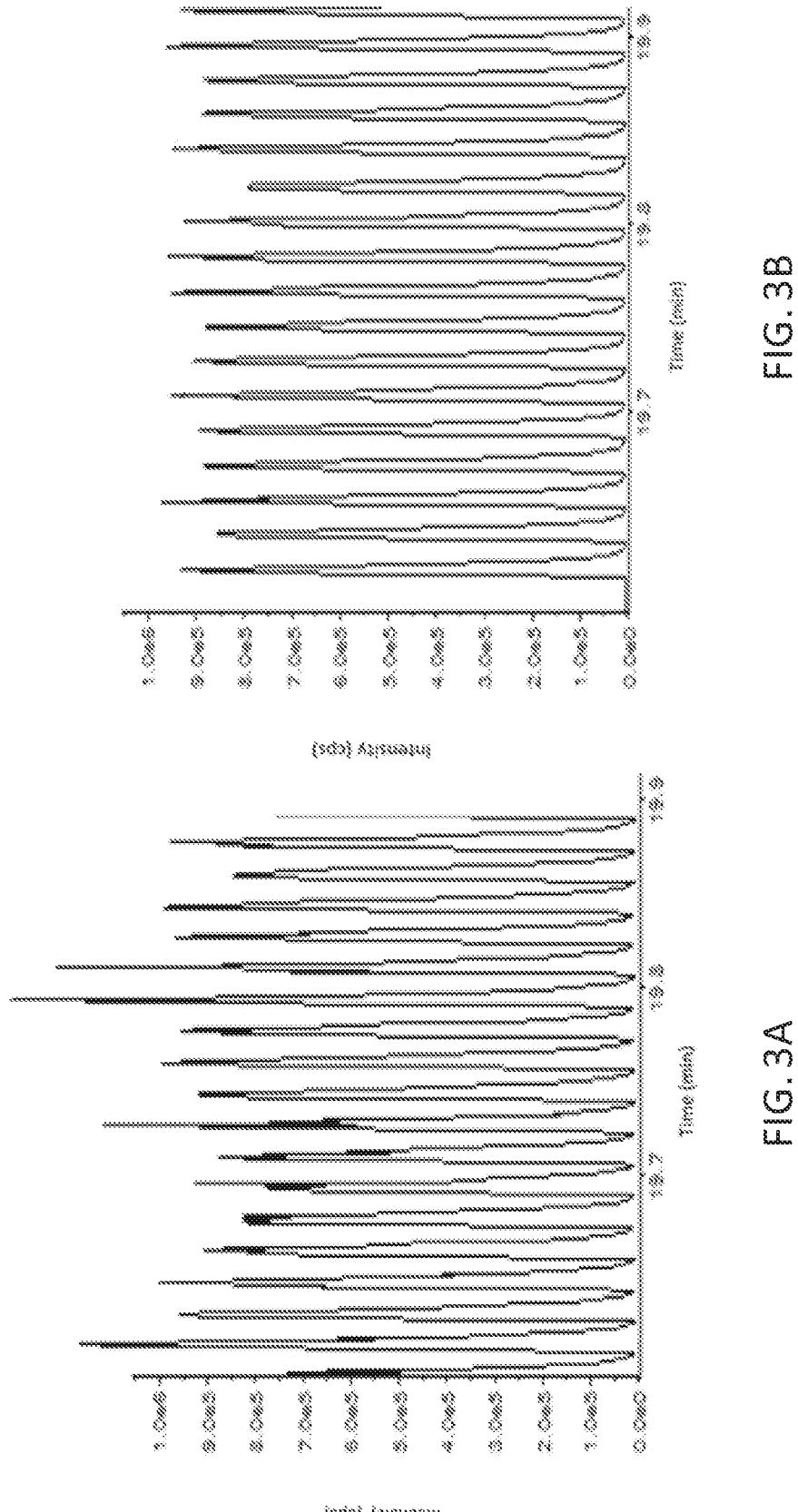
FIGS. 3A and 3B illustrates intensity over time for two different system settings in accordance with various embodiments of the disclosure.

The choppiness of the XIC signal and the peak shape may be directly related to an assay robustness. For example, FIG. 3A illustrates intensity (measured in counts per second) over time for a first system setting, and FIG. 3B illustrates intensity (measured in counts per second) over time for a second system setting. While the sample and carrier flow are the same in FIG. 3A as in FIG. 3B, the first system setting (FIG. 3A) results in more choppiness than the second system setting (FIG. 3B).

While choppy peaks (in FIG. 3A) do not increase the peak area coefficient of variation (CV) if there is only one MRM being analyzed, choppy peaks will affect the CV for multiple compound measurements. The choppy peaks also impact the SNR stability and directly reduce the measure of statistical effect size (Z') for the HTS assay under test. Because Z' is be used to indicate an assay robustness, the HTS assay under test in in FIG. 3A is less robust than the HTS assay under test in in FIG. 3B. Therefore, the quantitation stability may be inadequate when the SNR is not high enough (e.g., at or below the limit of quantification (LOQ)).

Figures 4A, 4B, 4C, 4D, 4E, 4F:
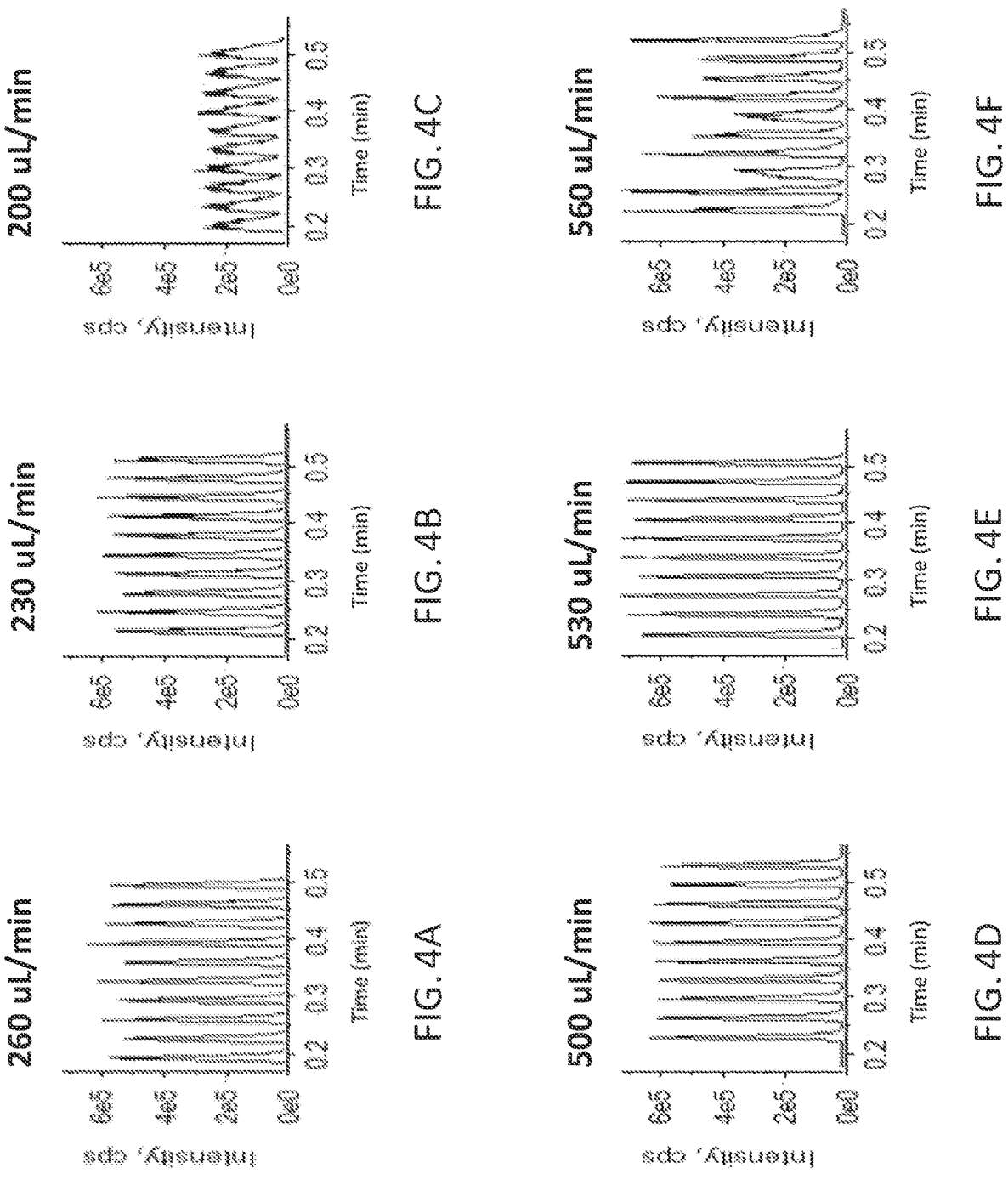
FIGS. 4A-4F illustrates the peak-choppiness for different example flowrates in accordance with various embodiments of the disclosure.

The peak-choppiness is directly relevant to the system optimization conditions (aspiration force from nebulizer venturi pull, the in-flow flowrate, etc.). FIG. 4A illustrates the peak-choppiness for a flowrate of 260 uL/min. FIG. 4B illustrates the peak-choppiness for a flowrate of 230 uL/min. FIG. 4C illustrates the peak-choppiness for a flowrate of 200 uL/min. FIG. 4D illustrates the peak-choppiness for a flowrate of 200 uL/min. FIG. 4E illustrates the peak-choppiness for a flowrate of 530 uL/min. FIG. 4F illustrates the peak-choppiness for a flowrate of 560 uL/min. Based on this example setup, when the nebulizer gas was strong enough and the protrusion has been optimized, the operational flowrate range, in which the smooth peak shape could be expected was about 260-530 uL/min. When the flowrate is either higher or lower than this range, the peak-choppiness was substantial.

The venturi aspiration force is weaker if the nebulizer gas flow is lower than the optimized range and/or the protrusion is not optimized. In this case, this operational flowrate range may be narrow or even hard to find. For example, when the nebulizer gas flowrate is less than 10 L/min, a flowrate to achieve the smooth peak-shape may not be possible.

There are many methods and systems to measure surface roughness in other areas of signal and image processing. However, these methods and systems may assume a flat surface as the underlying signal. Furthermore, electrical signal noise is typically characterized in frequency domain. Because an XIC signal is not well represented by sine waves, related artifacts make noise measurement in the frequency domain less precise.

Wavelet-based roughness feature extraction may be used to isolate an XIC signal peak region from background regions and characterize the peak-choppiness the XIC signal. As shown in FIG. 1, the processor 123 coupled to the electrode 137 may receive the XIC signal. The processor 123 may utilize a local maxima ratio (LMR) technique to compare the number of local maxima within a potential peak region using two different scales. The first scale is a noise wavelet scale, and the second scale is a peak-matching wavelet scale.

Local maxima found with the peak-matching wavelet scale correspond to true peak positions. Thus, there are as many local maxima found with the peak-matching wavelet scale as there are peaks in the signal. Local maxima found with the noise wavelet scale correspond to "shoulders" (i.e., choppiness) in the signal. The likelihood of such shoulders is greater when the noise power is higher. Thus, the LMR measure of roughness incorporates both, frequency and depth of choppiness. Choppiness may also be related to high frequency local maxima along the signal peak, such local maxima may have an amplitude that could be, for example, measured as a difference between local maxima and neighboring local minima. Shoulders are an edge case of local maxima amplitude becoming negligible compared to a signal gradient.

The processor 123 may also utilize a correlation technique to measure choppiness (e.g., injection-caused signal irregularities) according to a correlation of a noise wavelet scale response of a smoothed (e.g., ideal) signal and a noise wavelet scale response of an original signal. The wavelet noise scale response may be unaffected by low frequency smoothing artifacts. Therefore, the correlation, of the noise scale response of the original signal to the noise scale response of the smoothed signal, measures the roughness of interest.

Figure 5:
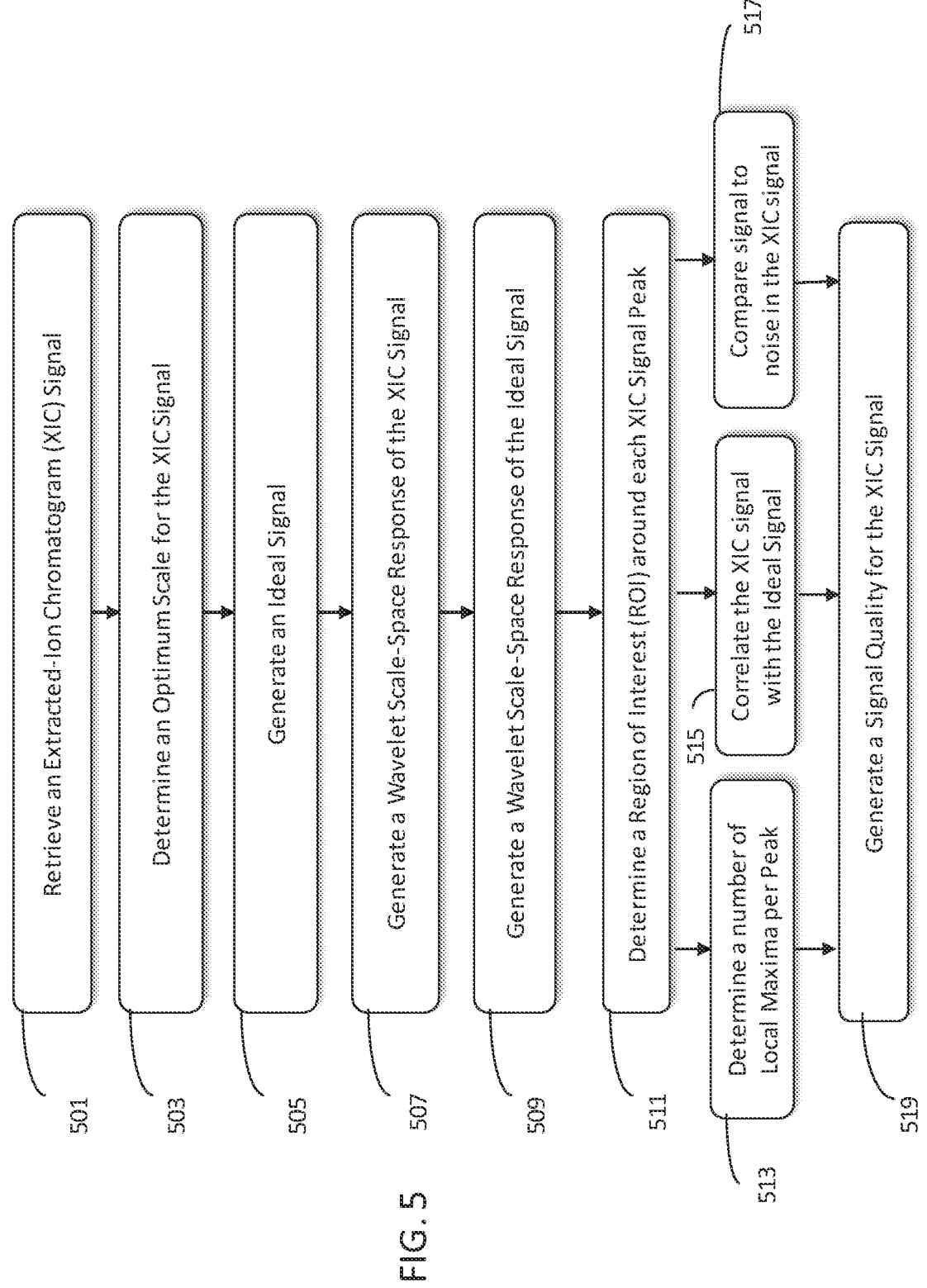
FIG. 5 illustrates an exemplary method for mass spectrometry signal quality assessment in accordance with various embodiments of the disclosure.

FIG. 5 illustrates an exemplary method for mass spectrometry signal quality assessment in accordance with various embodiments of the disclosure. At 501, a processor (e.g., processor 123 of FIG. 1) may retrieve an eXtracted-Ion Chromatogram (XIC) signal. At 503, the processor may determine an optimum scale for the XIC signal.

Figure 6:
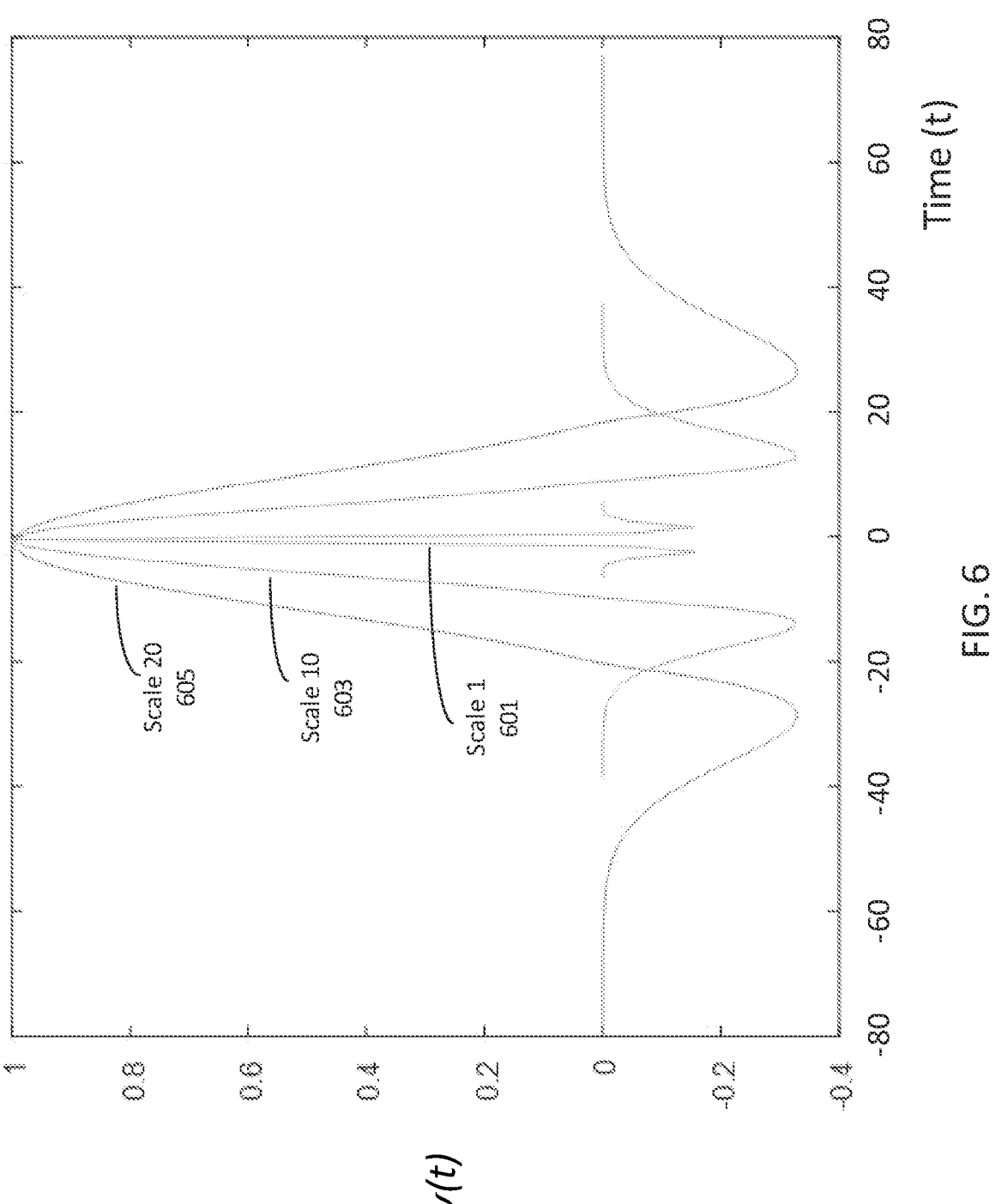
FIG. 6 illustrates an exemplary wavelets used at three scales in accordance with various embodiments of the disclosure.

FIG. 6 illustrates an exemplary wavelets used at three scales in accordance with various embodiments of the disclosure. The Ricker (i.e., Mexican hat) wavelet of the form:

$$ x \ldots = x^{n} \, exp(-x^{2}) \quad \text{where} $$
$$ x_{=t/} \quad \text{and} \quad = \text{scale} $$

may be used. As illustrated, wavelet scale 1 is the inner wavelet 601, wavelet scale 10 is the middle wavelet 603, and wavelet scale 20 is the outer (widest) wavelet 605.

Figure 7:
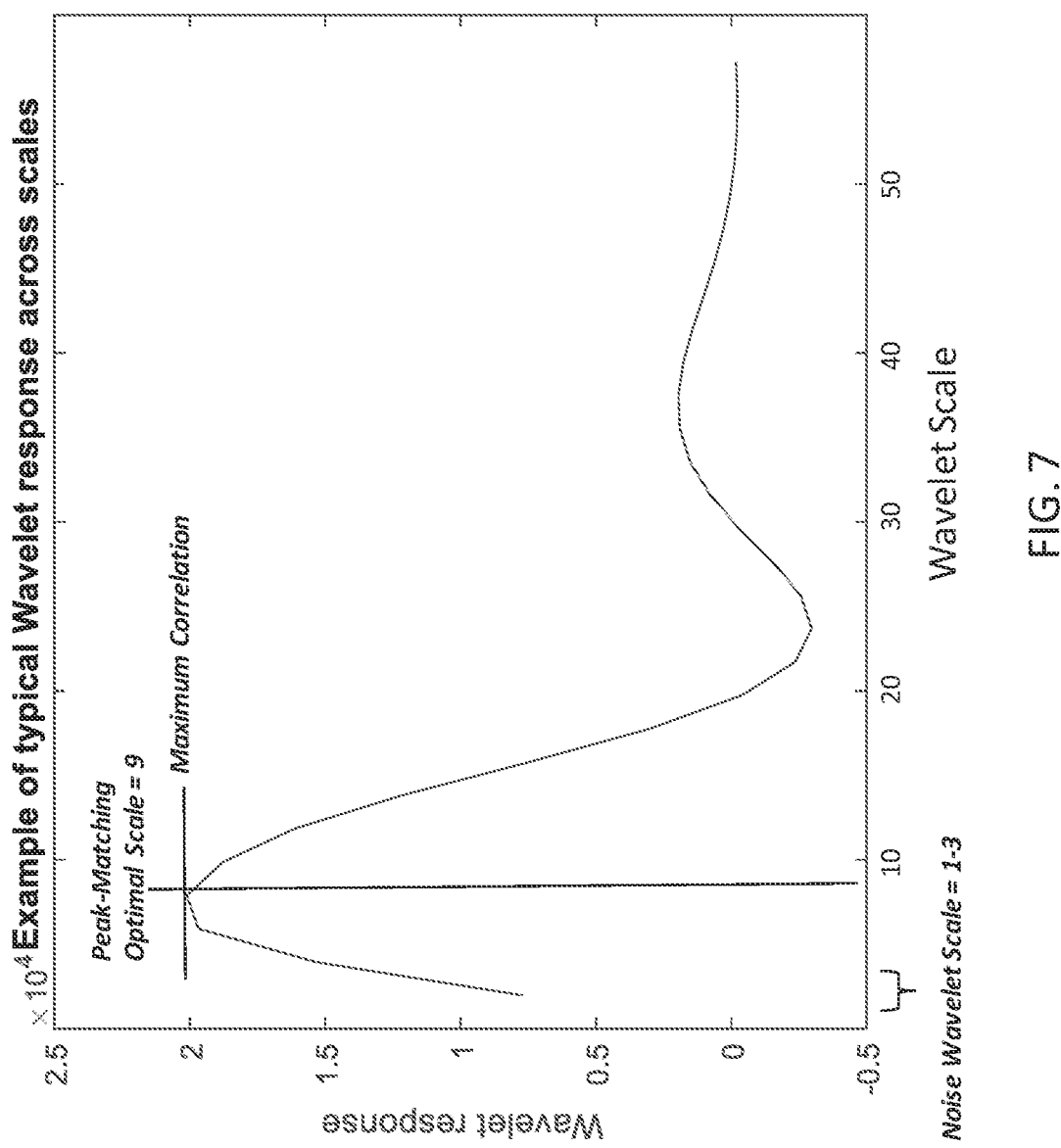
FIG. 7 illustrates an exemplary correlation between a signal and wavelets of different scales in accordance with various embodiments of the disclosure.

FIG. 7 illustrates an exemplary correlation between a signal and wavelets of different scales in accordance with various embodiments of the disclosure. An optimum scale is associated with a signal feature (signal peak). Because the region of interest (RoI) is the signal peak segment, the optimum scale is the scale that corresponds to a maximum wavelet response (e.g., wavelet scale 9) in scale-space. For signal quality analysis, scale 1 to the twice the optimal (e.g., scale 18) may be captured.

Wavelet responses at low scales (e.g., scales 1-3) may correspond to noise. Scales below the optimum scale are used to assess noise, detail pattern and detail intensity. Generally, number of local maxima at low scale corresponds to a choppiness patterns while wavelet response intensity at those scales corresponds to a depth of choppiness.

Turning back to FIG. 5, at 505, the processor may generate an ideal signal. The ideal signal may be based on the optimum scale. For example, noise may be removed from the XIC signal via smoothing and/or modelling.

At 507, the processor may generate a wavelet scale-space response of the XIC signal. At 509, the processor may generate a wavelet scale-space response of the ideal signal. FIGS. 8A-8C illustrates the wavelet scale-space response of three corresponding signals (in FIGS. 8D-8F respectively) in accordance with various embodiments of the disclosure. The x-axis of the wavelet scale-space response is time, and the y-axis is the wavelet scale. The gray level is correlated with the wavelet response intensity Turning back to FIG. 5, at 511, the processor may determine a region of interest (ROI) around each XIC Signal Peak. The optimum scale (scale 9 as shown in FIG. 8A) is used to segment RoI. Each signal in FIGS. 8D-8F is analyzed across a range of wavelet scales (e.g., 1 to 19). The circled regions 801, 803 and 805 in FIGS. 8A-8C respectively correspond to a noise/detail scales in a baseline region of the signal. The circled regions 807, 809 and 811 in FIGS. 8A-8C respectively correspond the noise/detail scales across the RoI (peak). These circled regions 807, 809 and 811 may be used to segment the noise regions. The segmentation could also be performed using other methods, such as by detecting an XIC peak region. Thus, signal quality may be measured with or without XIC peak detection, which is beneficial according to whether a peak detection algorithm is prone to errors.

In FIGS. 8A-8C, the noise/detail scales in the baseline region of the signal (circled regions 801, 803 and 805) indicate a relatively consistent noise level across the signals in FIGS. 8D-8F. However, the noise/detail scales in the ROA of the signal (circled regions 807, 809 and 811) indicate a significant difference among the signals in FIGS. 8D-8F. The region 807 is practically smooth for the ideal signal (FIG. 8D). The region 809 shows a few low intensity local maxima for the good signal (FIG. 8E). The region 811 shows many strong local maxima for the bad signal (FIG. 8F). Note, region 813 of the good signal only has one maxima along the peak (i.e., scale 9 in the RoI), however, region 809 comprises multiple local-maxima along the peak (e.g., scale 1 or 3 in the RoI). This demonstrate how a wavelet scale can depict signal irregularity or deviation from ideal. Wavelet responses may also be subjected to a linear or nonlinear pattern recognition model (e.g., Machine Learning model) to determine a region of interest.

At 513, the processor may determine a first quality parameter based on the number of local maxima per peak. For example, the ratio of actual peaks (using the optimum scale) to noise-scale peaks (using a scale less than the optimum scale) may be determined. The best ratio value is 1 (i.e., 1 actual peak per and no other peaks), and the worst ratio value is close to 0 (i.e., 1 actual peak among many noise-scale peaks).

At 515, the processor may determine a second quality parameter based on a correlation of the XIC signal with the ideal signal. The resulting correlation coefficient may be between 1 (perfect correlation) and 0 (no correlation).

At 517, the processor may determine a third quality parameter based on a comparison of signal to noise in the XIC signal. The difference between signal power and noise power may be divided by the signal power to generate a number between 1 (no noise) and 0 (the noise and signal are the same power).

At 519, the processor may generate a signal quality for the XIC signal based on a combination of one or more of the first, second and third quality parameters. For example, the average of the first, second and third quality parameters may be used as the signal quality for the XIC signal. Alternatively, one or more of the first, second and third quality parameters may be scaled before being summed with the other of the first, second and third quality parameters. Note that this is merely an example, and does not limit the quality parameters nor the number of quality parameters.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, wherein the system comprises:
a mass analyzer operable to generate a multidimensional signal, wherein the multidimensional signal comprises a plurality of outputs; and
a processor, wherein the processor is operable to:
generate a multidimensional wavelet scale-space response of the multidimensional signal,
generate an ideal wavelet scale-space response of an ideal signal,
generate a signal quality metric according to the multidimensional wavelet scale-space response,
compare the signal quality metric to an expected value generated from the ideal wavelet scale-space response, and
according to the comparison of the signal quality metric to the expected value, iteratively:
adjust an operational parameter of the mass analyzer,
regenerate a multidimensional wavelet scale-space response of the multidimensional signal, regenerate the ideal wavelet scale-space response of an ideal signal, regenerate the signal quality metric according to the regenerated multidimensional wavelet scale-space response, and compare the signal quality metric to an expected value generated from the regenerated ideal wavelet scale-space response.

2. The system of claim 1, wherein the wavelet scale-space response comprises a wavelet response over time for each of two or more scales.

3. The system of claim 1, wherein the signal quality metric is generated according to a region of interest.

4. The system of claim 3, wherein the region of interest comprises a local maxima of the multidimensional signal.

5. The system of claim 1, wherein the multidimensional signal is a chromatogram signal.

6. The system of claim 1, wherein the processor is operable to generate the signal quality metric according to a quality feature extraction from a wavelet scale-space response over a region of interest, and wherein the wavelet scale-space response comprises at least one scale.

7. The system of claim 1, wherein the processor is operable to generate the signal quality metric by combining two or more features of the multidimensional signal.

8. The system of claim 1, wherein the processor is operable to generate the signal quality metric according to a number of local maxima in a region of interest.

9. The system of claim 1, wherein the processor is operable to generate the signal quality metric by determining a wavelet scale-space response of the multidimensional signal, and wherein the wavelet scale-space response comprises a first number of local maxima at a first scale and a second number of local maxima at a second scale.

10. A method, wherein the method comprises:

generating a multidimensional signal via a mass analyzer, wherein the multidimensional signal comprises a plurality of outputs;

generating a multidimensional wavelet scale-space response of the multidimensional signal;

generating an ideal wavelet scale-space response of an ideal signal;

generating a signal quality metric according to the multidimensional wavelet scale-space response;

comparing the signal quality metric to an expected value generated from the ideal wavelet scale-space response; and according to the comparison of the signal quality metric to the expected value, iteratively:

adjusting an operational parameter of the mass analyzer, regenerating a multidimensional wavelet scale-space response of the multidimensional signal, regenerating the ideal wavelet scale-space response of an ideal signal, regenerating the signal quality metric according to the regenerated multidimensional wavelet scale-space response, and comparing the signal quality metric to an expected value generated from the regenerated ideal wavelet-scale space response.

11. The method of claim 10, wherein the wavelet scale-space response comprises a wavelet response over time for each of two or more scales.

12. The method of claim 10, wherein the signal quality metric is generated according to a region of interest.

13. The method of claim 12, wherein the region of interest comprises a local maxima of the multidimensional signal.

14. The method of claim 10, wherein the multidimensional signal is a chromatogram signal.

15. The method of claim 10, wherein generating the signal quality metric comprises extracting a quality feature from a wavelet scale-space response over a region of interest, and wherein the wavelet scale-space response comprises at least one scale.

16. The method of claim 10, wherein generating the signal quality metric comprises combining two or more features of the multidimensional signal.

17. The method of claim 10, wherein generating the signal quality metric is according to a number of local maxima in a region of interest.

18. The method of claim 10, wherein generating the signal quality metric comprises determining a wavelet scale-space response of the multidimensional signal, and wherein the wavelet scale-space response comprises a first number of local maxima at a first scale and a second number of local maxima at a second scale.

* * * * *